United States Patent [19]
Peiffer et al.

[11] Patent Number: 4,683,952
[45] Date of Patent: Aug. 4, 1987

[54] FLUID LOSS CONTROL IN OIL FIELD CEMENTS

[75] Inventors: Dennis G. Peiffer, East Brunswick; Robert D. Lundberg, Bridgewater, both of N.J.; Lawrence Sedillo, Houston; John C. Newlove, Kingwood, both of Tex.

[73] Assignee: Exxon Research and Engineering Company, Florham Park, N.J.

[21] Appl. No.: 903,450

[22] Filed: Sep. 4, 1986

Related U.S. Application Data

[62] Division of Ser. No. 651,897, Sep. 19, 1984, Pat. No. 4,626,285.

[51] Int. Cl.$^4$ .......................... C04B 7/35; E21B 33/14
[52] U.S. Cl. ...................... 166/293; 106/90; 106/314
[58] Field of Search .................. 166/293; 106/90, 314

[56] References Cited

U.S. PATENT DOCUMENTS

| | | | |
|---|---|---|---|
| 3,931,096 | 1/1976 | Guilbault et al. | 166/293 X |
| 3,943,996 | 3/1976 | Guilbault et al. | 166/293 |
| 4,015,991 | 4/1977 | Persinski et al. | 166/293 X |
| 4,076,699 | 2/1978 | Grimaud et al. | 106/90 X |
| 4,393,939 | 7/1983 | Smith et al. | 106/90 X |
| 4,515,635 | 5/1985 | Prabhakara et al. | 166/293 X |

*Primary Examiner*—Stephen J. Novosad
*Attorney, Agent, or Firm*—Richard E. Nanfeldt

[57] ABSTRACT

A cement fluid-loss composition and its use in a well cementing process are disclosed. The cement fluid loss composition comprises an aqueous slurry of about 35 to about 90 weight percent of water based on weight percent of dry cement; and about 0.1 to about 2 weight percent of a terpolymer based on weight percent of dry cement, said terpolymer having the formula:

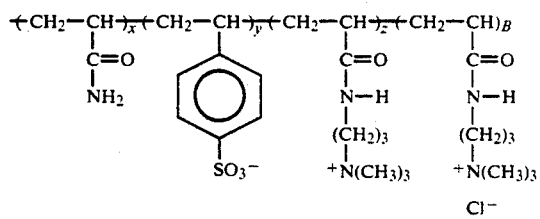

wherein x is about 40 to about 98 mole %, more preferably about 50 to about 95 mole %, and most preferably about 80 to about 90, y is about 1 to about 50 mole %, more preferably about 2 to about 20 mole %, and most preferably about 5 to about 10 mole %, and z is about 1 to about 50 mole %, more preferably about 2 to about 20, and most preferably about 5 to about 10, y is equal to z, B is about 1 to about 50 mole %, more preferably about 2 to about 20 mole %, and most preferably about 5 to about 10 mole %, wherein B, y and z are less than 60 mole %.

4 Claims, No Drawings

FLUID LOSS CONTROL IN OIL FIELD CEMENTS

This is a division of application Ser. No. 651,897 9-19-84, now U.S. Pat. No. 4,626,285.

BACKGROUND OF THE INVENTION

1. Field of the Invention

The present invention relates to materials which reduce the filtration of fluid into permeable earth formations during cementing processes in the drilling and completing of subterranean wells, particularly wells for the recovery of petroleum resources.

Petroleum well cementing is the process of mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition the cement aids in protecting the casing from corrosion, preventing blowouts by quickly sealing formations, protecting the casing from shock loads in drilling deeper wells, and sealing off lost circulation or thief zones.

A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid lost can damage sensitive formations. Cement fluid loss is particularly a problem in the process known as squeeze cementing.

There is a requirement, therefore, for materials which, when added to the cement formulation, reduce the loss of fluid from the slurry to porous formations.

2. Description of the Prior Art

A type of fluid loss agent used in oil well cementing consists of a medium molecular weight grade of hydroxyethylcellulose (HEC) which may be employed with or without a dispersant such as condensed napthalenesulfonic acid salts. There are several disadvantages to the use of hydroxyethylcellulose as a cement fluid loss control agent, however, among which are that it causes undesirable viscosification and retardation of the cement and that it loses effectiveness in the presence of soluble calcium salts and at elevated temperatures.

Another cement additive employed for control of fluid loss is a copolymer of acrylamide and acrylic acid [L. F. McKenzie, F. M. McElflesh, SPE 1-623,279 (1982)]. Although this material performs well at high temperature and in the presence of soluble calcium salts, it has the undesirable property of strongly retarding cement. This retarding effect increases with increasing temperature, most likely due to the hydrolysis of the unstable amide groups contained in the polymer which accelerates at elevated temperature. Hydrolysis of amide functions produces additional carboxylic acid residues which are credited with cement retarding activity.

Still other materials utilized for the control of fluid loss during well cementing are combinations of polyamines and either lignosulfonate or condensed naphthalenesulfonic acid salts [L. F. McKenzie, J. V. Eckerts, and P. M. McElfresh, Oil and Gas J. 80 (13) 146 (1982)]. These additives are valuable since they cause little viscosification of the cement, and they have little sensitivity to dissolved calcium and moderately high temperatures. The utility of the polyamine-sulfonate combination is somewhat limited, however, by two side effects they produce: retardation and settlement (free water) of the cement.

Mixtures of HEC, polyvinyl pyrrolidone and sodium naphthalenesulfonate have been reported as cement fluid loss additives (Wersend, U.S. Pat. No. 3,132,693 (1964) as have mixtures of poly(vinylpyrrolidone) and sodium naphthalenesulfonate-formaldehyde condensation products (U.S. Pat. No. 3,359,225).

Also complex mixtures of maleic anhydride N-vinylpyrrolidone copolymers with polymers of poly (arylvinylbenzyl) alkyl- and hydroalkyl substituted quaternary ammonium bases and salts have been used (Wahl, U.S. Pat. No. 3,140,269 (1964)).

An improved fluid loss additive for well cements consists of 30 to 70 weight percent of N-vinylpyrrolidone homopolymer, from about 5 to 19 weight percent of carboxylmethylhydroxyethylcellulose, and the sodium salt of condensed naphthalenesulfonic acid. [B. W. Hale, U.S. Pat. No. 4,258,790 Mar. 31, 1982)].

Copolymers of N-vinylpyrrolidone and metal salts of styrenesulfonic acid (1) are known, but only as components in oil containing microcapsules used in films. [K. Saeki, H. Matsukawa, U.S. Pat. No. 3,855,146 (1974)].

Despite the art for the control of cement fluid loss which is already known, there exists a need for novel agents capable of improving fluid loss control which are not reduced in utility by the limitations described above.

SUMMARY OF THE INVENTION

Accordingly, the present invention teaches the preparation of terpolymers of acrylamide (AM), methacrylamidopropyltrimethyl ammonium chloride (MAPTAC), and metal neutralized styrenesulfonic acid (SSS) and the use of these terpolymers as agents for the control of fluid loss to permeable earth formations from formulations for the cementing of subterranean wells, particularly wells from which are produced natural petroleum resources.

The present invention discloses cementing formulations which comprise: (a) water; (b) a hydraulic cement; (c) from 0.05 to 5.0 wt % based on the weight of the dry cement of a terpolymer of acrylamide, methacrylamidopropyltrimethyl ammonium chloride, and a metal salt of styrenesulfonate, said terpolymer ranging in composition from 40 to 98 mole % and in reduced viscosity in 2% NaCl at 0.5 wt % from 0.5 to 15 dl/g, and (d) optionally other such cement additives as may be required to achieve the desired cementing results.

In addition, the present invention relates to a family of intramolecular polymeric complexes (i.e. polyampholytes) which are terpolymers of acrylamide/metal styrenesulfonate/methacrylamidopropyltrimethylammonium chloride (MAPTAC) and to the use of the polyampholytes as agents for the control of fluid loss to permeable earth formations from formulations used for cementing subterranean wells, particularly those wells from which natural petroleum resources are produced.

The water-soluble terpolymers of this invention are terpolymers of acrylamide/sodium styrene sulfonate/methacrylamidopropyltrimethylammonium chloride. These polymers are prepared by free radical polymerization in aqueous solution at 40°–60° C. Typical free radical initiators for the polymerization are agoisobutyronitrile (AIBN), potassium persulfate and the like.

The present invention relates to improved process for cementing pipe in a gas or oil well which comprises a terpolymer having the formula:

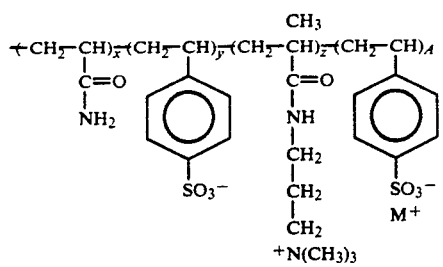

wherein x is about 40 to about 98 mole %, more preferably about 50 to about 95 mole %, and most preferably about 80 to about 90, y is about 1 to about 50 mole %, more preferably about 2 to about 20 mole %, and most preferably about .5 to about 10 mole %, and z is about 1 to about 50 mole %, more preferably about 5 to about 10, y is equal to z, A is about 1 to about 50 mole %, more preferably 2 to about 20 mole %, and most preferably about 5 to 10 mole %, wherein A, y and z are less than 60 mole % and M is an amine or a metal cation selected from the group consisting of aluminum, iron, lead, Groups IA, IIA, IB and IIB of the Periodic Table of Elements.

Several other polymer compositions were synthesized along the identical synthetic route. The composition of these polymers are shown in the following formulae: (Note: These possess an excess of the cationic monomer - MAPTAC).

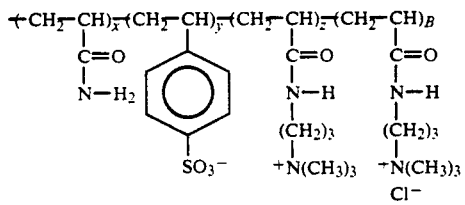

wherein x is about 40 to about 98 mole %, more preferably about 50 to about 95 mole %, and most preferably about 80 to about 90, y is about 1 to about 50 mole %, more preferably about 2 to about 20 mole %, and most preferably about 5 to about 10 mole %, and z is about 1 to about 50 mole %, more preferably about 2 to about 20, and most preferably about 5 to about 10, y is equal to z, B is about 1 to about 50 mole %, more preferably about 2 to about 20 mole %, and most preferably about 5 to about 10 mole %, wherein B, y and z are less than 60 mole %.

It should be pointed out that neither the mode of polymerization (solution, suspension, or emulsion polymerization technique and the like), nor the initiator is critical, provided that the method or the products of the initiation step does not inhibit production of the polyampholyte or chemically modify the initial molecular structure of reacting monomers.

Typically water soluble monomers incorporated into the terpolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, 2-methacryloxy-2-ethyltrimethylammonium chloride, trimethylmethacryloxyethylammonium methosulfate, 2-acrylamide-2-methylpropyltrimethylammonium chloride, vinylbenzyltrimethylammonium chloride, and the like.

Nonionic: (N,N-dimethyl)acrylamide, hydroxyethyl (meth)acrylate, alkyl substituted acrylamide, (meth)acrylates, N-vinyllactanes (e.g., n-vinyl-2-pyrrolidone), and the like.

GENERAL DESCRIPTION OF THE INVENTION

The present invention relates to the preparation of terpolymers of acrylamide, methacrylamidopropyltrimethylammonium chloride, and metal salts of styrenesulfonic acid and to the use of the terpolymers as agents for the control of fluid loss to permeable earth formations from formulations used for cementing subterranean wells, particularly those wells from which natural petroleum resources are produced.

The terpolymers of this invention are terpolymers of acrylamide, methacrylamidopropyltrimethylammonium chloride, and metal salts of styrenesulfonic acid. These terpolymers are prepared by free radical copolymerization in aqueous solution at 40°-60° C. Typical free radical initiators for the polymerization are azoisobutyronitrile (AIBN), potassium peroxydisulfate, and the like. The terpolymers consist of from 40 to 98 mole % of N-vinylpyrrolidone and 1-50 mole % of a salt of styrenesulfonic acid. Preferred for their better performance as cement fluid loss control agents are the copolymers consisting of 50-95 mole % of N-vinylpyrrolidone and 2-20 mole % styrenesulfonic acid salt.

The cation of the styrenesulfonic acid salt may be any cation which provides a water soluble salt in combination with the styrenesulfonate anion and which causes no undesirable effects in the cementing formulation such as excessive cement acceleration, retardation, free water, thickening or thinning, etc. Some cations which provide styrenesulfonic acid salts suitable for use in these terpolymers are lithium, potassium, sodium, triethylammonium, tri(hydroxyethyl) ammonium and the like. These cations represent typical examples of appropriate species, but a wide range of cations may be properly used, and the listing of typical cations is in no way intended to limit the scope of the invention.

The terpolymers found useful as agents for the control of cement fluid loss are further characterized by the viscosity which they impact to aqueous solutions. The viscosity parameter chosen to describe the terpolymers of this invention is the so-called reduced viscosity of solutions consisting of 2% by weight sodium chloride, 0.5% by weight polymer, and the remainder water. The terpolymers of acrylamide/methylacrylamidopropyltrimethylammonium chloride and styrenesulfonic acid salts which are disclosed as part of the subject invention are those having a reduced viscosity of from 0.5 to 15 dl/g.

This invention also discloses a means for controlling the fluid loss to permeable earth formations from formulations used in the cementing of subterranean wells, particularly those wells drilled for the production of oil and gas by use of the terpolymers discussed above and subsequently detailed in Examples 1 through 6. The amount of the terpolymer utilized in a cement formulation will vary with the particular borehole environment at hand. Geological formation characteristics, borehole properties, borehole depth, contaminants, temperatures and pressures encountered, cement type and other additives, and purpose and method of application of the cementing operation will influence the determination of quantities of the terpolymers of this invention to be used in a particular cement formulation to achieve the desired effect. In addition the particular properties of the terpolymer will influence the determination of quantities to be used. Because of these factors, it is impossible to specifically state nominal usage levels under all environments or conditions. Those skilled in the art of subterranean well cementing will be able to easily determine needed quantities of the terpolymers for cement fluid loss control by testing formation characteristics, formation temperatures and pressures, and cement formulation characteristics, and by otherwise assessing the fluid loss characteristics required of the cement formulation. Nevertheless, it can be stated that a treatment rate of 0.1% to 2% (by weight based on dry cement weight) of the terpolymer should be appropriate. It is possible that under some circumstances as little as 0.05% or as much as 5% of the terpolymer would be required.

The oil well cements employed in the instant invention are API classification cements - A, B, C, D, E, F, G, and H, pozzolanic cements, pozzolan-line cements, resin or plastic cements, gypsum cements, diesel oil cements, expanding cements such as API classification cements K, and M, calcium aluminate cements, and latex cements.

The terpolymers prepared and used according to this invention may be added to the cement slurry in a variety of ways. They may be applied in a solid form either being premixed with the cement before it is added to water or the solid polymers may be added to the cement water slurry. Alternatively, the terpolymers may be applied as aqueous solutions to the dry cement or cement slurry. In the latter cases the water included in the terpolymer solution replaces an equal amount of water normally included in the cement slurry.

The amounts of water and cement contained in the subject cementing compositions which include the terpolymers of AM/SSS/MAPTAC are highly dependent on the type of cement being used, the other additives being used in the cementing formulation, the borehole conditions and the techniques being used to apply the cement formulation to the borehole. Those skilled in the art of borehole cementing will by consideration of these factors be able to determine the proper cement slurry formulation which will maximize benefits from inclusion of the terpolymers of this invention.

A variety of other additives may be used in a cement formulation treated with the terpolymers of this invention. For example, cement hardening retarders, hardening accelerators, materials to lower or raise the density of the slurry, lost-circulation-control agents, friction reducers, stabilizers for high temperature strength, etc. may all be used together with this polymer. This list of formulation ingredients which might accompany the polymer of this invention in a cement slurry is meant to be exemplary, but in no way are the accompanying materials limited to those mentioned herein. These and other cement additives may be combined with the subject terpolymer as it is determined appropriate by workers skilled in the well cementing art.

The terpolymers, cement formulations, and processes described herein as embodiments of the subject invention represent substantial improvements to the art of subterranean well cementing. As compared to the materials and methods known previously for the control of fluid loss in well cementing formulations, use of the subject terpolymers is advantageous in several respects. Unlike many of the previously known compositions, the terpolymers described herein are fully active fluid loss control agents alone. They have remarkable thermal stability and provide excellent fluid loss control at temperatures greater than 200° F. without many of the undesirable side effects common to other cement fluid loss control agents. The subject terpolymers cause little thickening of the cement slurry, little retardation of the cement thickening and no increase in free water. Thus, these materials represent a broadly applicable, general purpose cement fluid loss control treatment, of the type needed for the difficult cementing environments more and more commonly encountered in today's well drilling situations.

DETAILED DESCRIPTION OF THE INVENTION

The following examples will further illustrate the novel qualities of the additive compositions and processes of the present invention without in any way limiting the scope of this invention.

EXAMPLE 1

Synthesis

A representative example for the synthesis of the terpolymer materials (designated 136A) is outlined below.

Into a 1-liter, 4-necked flask add:

12.08 g methacrylamidopropyltrimethylammonium chloride (MAPTAC), 50% aqueous solution;

5.64 g sodium styrene sulfonate (SSS)

35.0 g acrylamide (AM)

300 ml distilled water or on a molar basis:

5.0 moles MAPTAC 5.0 moles SSS 90.0 moles AM

We should emphasize that the anionic and cationic monomers were added to the aqueous phase without attempting to form ion-pair comonomers that do not possess nonpolymerizable counterions.

The solution was purged with nitrogen gas for approximately one hour to remove dissolved oxygen. As the nitrogen gas purging began, the solution is heated to 50° C. At this point, 0.1 g potassium persulfate (i.e., initiator) was added to the solution. After 8 hours, the polymer was precipitated from solution with acetone. Subsequently, the resulting polymer was washed several times with a large excess of acetone and dried in a vacuum oven at 60° C. for 24 hours. The composition of 136A is as follows:

$x = 0.90$
$Y + Z = 0.082$
$A = 0.018$

Note that the polymer structure has 1.8 mole % "excess" nonpolymerizable free charge attached to some of the styrene sulfonate units.

EXAMPLE 2

A further representative example for the synthesis of an intramolecular polymer complex (designated 136B) is similar to Example 1, except for the initial monomer feed composition. This is outlined below:

- 34.6 g methacrylamidopropyltrimethylammonium chloride, 50% aqueous solution
- 5.76 g sodium styrene sulfonate
- 35.0 g acrylamide or on a molar basis
- 5.0 moles MAPTAC
- 7.0 moles SSS
- 88.0 moles AM The composition of 136B is as follows:

x = 0.887
Y + Z = 0.087
B = 0.026

Note that the polymer structure has 2.6 mole % "excess" nonpolymerizable free charge attached to some of the MAPTAC units.

EXAMPLE 3

A further representative example for the synthesis of an intramolecular polymer complex (designated 136C) is similar to Example 1, except for the initial monomer feed composition. This is outlined below.

- 45.5 g methacrylamidopropyltrimethylammonium chloride, 50% aqueous solution
- 5.9 g sodium styrene sulfonate
- 35.0 g acrylamide or on a molar basis
- 5.0 moles MAPTAC
- 9.0 moles SSS
- 86.0 moles AM The composition of 136C is as follows:

x = 0.871
Y + Z = 0.901
B = 0.038

Again, it should be noted that the polymer structure has 3.8 mole % "excess" nonpolymerizable free charge attached to some of the MAPTAC units.

136A is best described as an intrapolymer complex with a modest amount of anionic charge, while 136B and 136C terpolymers contain increasing amounts of cationic charge.

As is well known to those versed in the art, the level of ionic monomers incorporated in the growing polymer chain is directly related to the initial concentration of the reacting species. Therefore, modulation of the ionic charge within the polymer structure is accomplished through changes in the initial anionic and/or cationic vinylic monomer concentrations.

EXAMPLE 4

Tests were performed to show the ability of the subject terpolymers to control fluid loss from cement slurries.

In those cases where complete dehydration of the cement occurred before the 30 minute test period had expired the fluid loss was extrapolated to 30 minutes using the relationship $FL_{30} = FL_T(30)/T$ where $FL_{30}$ = extrapolated 30 min. fluid loss in ml
$FL_T$ = fluid loss for time T in ml
T = duration of test until complete cement slurry dehydration in min The fluid loss values obtained in this way are denoted by an asterisk (*).

The test results given in Table 1 demonstrate the significant control of cement fluid loss afforded by polymers of this invention.

TABLE 1

| Description | Fluid loss ml/30 min. |
|---|---|
| polyacrylamide ampholyte terpolymer-136A | 30 |
| acrylamide/acrylic acid copolymer (90 mole %/10 mole %) respectively | 84 |
| neat cement | +3000 ml |

EXAMPLE 5

A test was performed to show the lack of effect of the terpolymers of this invention upon the tendency of solid material to settle from cement slurries containing them (free water content). Each cement slurry was prepared as described in Example 4. After the 20 min. paddle stirred aging period, the slurry was again mixed for 35 sec. at high speed in a Waring Blender. The slurry was then used to fill a 250 ml graduated glass cylinder having a graduated length of 240 mm. After the cylinder stood quiescent for 2 hours the supernatant water was measured. This procedure is similar to but slightly simpler than that described in API Specification 10, Appendix K.

The results recorded in Table 2 attest to the lack of effect on cement slurry free water exerted by the terpolymers described here.

TABLE 2

| Polymer Sample No. | Free Water, ml |
|---|---|
| None | 2 |
| 136A | nil |
| 90/10 AM/AA | nil |

What is claimed is:

1. A process for cementing pipe or casing on a gas or oil well which penetrates a formation which comprises depositing in the space between said pipe or said casing and said formation an aqueous slurry comprising:
   (a) about 35 to about 90 weight percent of water based on weight percent of dry cement; and
   (b) about 0.1 to about 2 weight percent of a terpolymer, based on weight percent of dry cement said terpolymer having the formula:

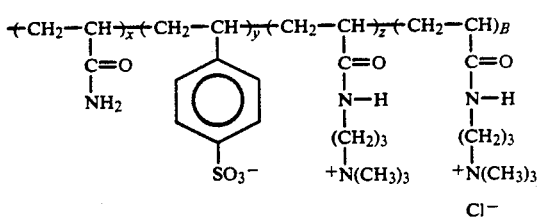

wherein x is about 40 to about 98 mole %, y is about 1 to about 50 mole %, z is about 1 to about 50 mole %, y is equal to z, a is about 1 to about 50 mole %, wherein B, y and z are less than 60 mole %.

2. A method according to claim 1 wherein M is sodium.

3. A method according to claim 1 wherein said terpolymer possesses a nonstoichiometric amount of anionic groups.

4. A method according to claim 1 wherein said water has about 0.01 to about 10 grams of salt of acid per 100 ml of said water.

* * * * *